US009189393B2

(12) United States Patent
Adachi et al.

(10) Patent No.: US 9,189,393 B2
(45) Date of Patent: Nov. 17, 2015

(54) COMPUTER, CONTROL METHOD OF COMPUTER, AND RECORDING MEDIUM

(75) Inventors: Masahiko Adachi, Tokyo (JP); Hiroyasu Nishiyama, Kawasaki (JP); Motoki Obata, Toda (JP)

(73) Assignee: HITACHI, LTD., Tokyo (JP)

( * ) Notice: Subject to any disclaimer, the term of this patent is extended or adjusted under 35 U.S.C. 154(b) by 208 days.

(21) Appl. No.: 13/880,198

(22) PCT Filed: Nov. 25, 2011

(86) PCT No.: PCT/JP2011/006557
§ 371 (c)(1),
(2), (4) Date: Jul. 2, 2013

(87) PCT Pub. No.: WO2012/073460
PCT Pub. Date: Jun. 7, 2012

(65) Prior Publication Data
US 2013/0290382 A1  Oct. 31, 2013

(30) Foreign Application Priority Data
Dec. 2, 2010 (JP) ................................. 2010-268951

(51) Int. Cl.
*G06F 7/00* (2006.01)
*G06F 17/30* (2006.01)
*G06F 12/02* (2006.01)
*G06F 11/07* (2006.01)
*G06F 9/455* (2006.01)

(52) U.S. Cl.
CPC ........ *G06F 12/0253* (2013.01); *G06F 11/0754* (2013.01); *G06F 12/0276* (2013.01); *G06F 17/30115* (2013.01); *G06F 9/45504* (2013.01); *G06F 2212/1016* (2013.01)

(58) Field of Classification Search
None
See application file for complete search history.

(56) References Cited

U.S. PATENT DOCUMENTS 6,910,213 B1    6/2005   Hirono et al.
7,313,661 B1   12/2007   Dmitriev
(Continued)

FOREIGN PATENT DOCUMENTS

| JP | 11-212808 A   | 8/1999 |
| JP | 2007-004413 A | 1/2007 |
| JP | 2010-044532 A | 2/2010 |

OTHER PUBLICATIONS

Appel, A. W, Simple generational garbage collection and fast allocation, Software Practice and Experience, 1989.
(Continued)

*Primary Examiner* — Uyen Le
(74) *Attorney, Agent, or Firm* — Mattingly & Malur, PC

(57) ABSTRACT

A computer includes a storage region in which an object generated by executing a program is disposed, and a control unit that performs execution of the program and releasing of the storage region. The control unit updates time information using garbage collection, a capacity of objects in a memory, or similar as a trigger, acquires information of a program generating an object and time information at the time of generation of the object which are recorded in a recording device so as to be correlated with each other when the object is generated. The control unit further detects an object which is unnecessary to execute a subsequent program and acquires the time information, and records a difference between the time information at the time of the generation and at the time of the detection in the recording device so as to be correlated with the information of the program.

16 Claims, 19 Drawing Sheets

(56) References Cited

U.S. PATENT DOCUMENTS

| | | |
|---|---|---|
| 2002/0019716 A1 | 2/2002 | Agesen et al. |
| 2005/0268286 A1 | 12/2005 | Obata et al. |
| 2009/0037684 A1 | 2/2009 | Obata et al. |
| 2010/0049938 A1 | 2/2010 | Izumi et al. |
| 2010/0250629 A1 | 9/2010 | Obata et al. |
| 2011/0213943 A1 | 9/2011 | Obata et al. |
| 2012/0198184 A1 | 8/2012 | Adachi et al. |

OTHER PUBLICATIONS

Motoki Obata et al., Explicitly Managed Memory for Java, Journal by the Information Processing Society of Japan, 2009.

Stephan M. Blackburn et al., Pretenuring for Java, ACM. Conference on Object-Oriented Programming, Systems, Languages and Applications, 2001.

Motoki Kohata et al., "Explicitly Managed Heap Memory for Java", IPSJ Journal, Jul. 15, 2009, vol. 50, No. 7, pp. 1693 to 1715.

```
1. public class Test {
2.    public static void main() {
3.        Sample s = new Sample();
4.        // any operations
5.        Obj o = new Obj();
7.        // any operations
8.        s = null;
9.        o = null;
10.   }
11. }
```

20

GENERATION POINT TABLE 24

| GENERATION POINT ID | TYPE | METHOD NAME | LINE NUMBER |
|---|---|---|---|
| 1 | java.lang.Object | m1 | line1 |
| 2 | java.util.ArrayList | m2 | line2 |
| 3 | java.util.LinkedList | m2 | line10 |
|  |  | ... | ... |

FIG. 4

OBJECT GENERATION TABLE 23

| GENERATION POINT ID (231) | OBJECT ID (232) | GENERATION TIME INFORMATION (233) |
|---|---|---|
| 1 | O1 | 1 |
| 2 | O2 | 1 |
| 3 | O3 | 2 |
| ... | ... | ... |

FIG. 5

LIFE INFORMATION TABLE 26

| GENERATION POINT ID (261) | LIFE (262) |
|---|---|
| 1 | 1 |
| 2 | 2 |
| 3 | 3 |
| | ... |

FIG. 17

EXTERNAL MEMORY MANAGEMENT TABLE 28

| GENERATION TIME INFORMATION (281) | LIFE (282) | EXTERNAL MEMORY ID (283) |
|---|---|---|
| 1 | 1 | ex1 |
| 1 | 2 | ex2 |
| 2 | 3 | ex3 |
|  | ... |  |

```
1.  public class Test {
2.      public static void main() {
3.          Sample s1 = new Sample();
4.          Obj o1 = new Obj();
5.          // any operations
6.          Obj o2 = new Obj();
7.          // any operations
8.          Sample s2 = new Sample();
9.          // any operations
10.         s1 = null;
11.         s2 = null;
12.         o1 = null;
13.         // any operations
14.         o2 = null;
15.     }
16. }
```

FIG. 22

```
void func() {
    em = new ExplicitMemory();
    em.enter();
    Obj obj1 = new Obj();
    Obj obj2 = new Obj();
    Obj obj3 = new Obj();
    em.exit();

em.reclaim();
}
```

COMPUTER, CONTROL METHOD OF COMPUTER, AND RECORDING MEDIUM

The present application is the U.S. National Phase of International Application No. PCT/JP2011/006557, filed Nov. 25, 2011, which claims the benefit of Japanese Patent Application No. 2010-268951, filed on Dec. 2, 2010, the entire contents of which are hereby incorporated by reference.

TECHNICAL FIELD

The present invention relates to a computer which performs memory management of the computer, a control method of the computer, and a recording medium.

BACKGROUND ART

In developing a computer program, it is known that securing and releasing processes of a memory region used by a program is likely to cause inconvenience to the program such as referring to an incorrect region. Particularly, in developing a large scale program, it is difficult for a programmer to completely understand all of memory securing and releasing processes.

As means for solving this, NPL 1 discloses a garbage collector which automatically performs memory management in a program. The garbage collector is a function of executing garbage collection (hereinafter, referred to as "GC") which is a process of determining an unnecessary object and releasing a region taken up by the object among memory regions which are dynamically secured by a program. For example, in Java (registered trademark) which is one of language processing systems with a memory management function using the garbage collector, means for securing a memory region is prepared, and, a Java program developer explicitly describes securing of a memory region such that the garbage collector dynamically performs GC and releases the memory.

An execution form of GC largely includes two methods. There are a method of executing GC in parallel to execution of a Java program and a method of pausing execution of the Java program and executing GC. In the former, a pause time due to GC tends to be shortened although an execution performance of the Java program is reduced. In the latter, a pause time due to GC tends to be lengthened although an execution performance of the Java program increases.

As means for solving the latter, NPL 2 proposes a computer system which has a memory region (hereinafter, referred to as an "external memory region") other than targets managed by GC as well as a memory region managed by GC. This computer system disposes an object generated in a specific section of a program in the external memory region. The specific section is designated by executing a program which is explicitly described in advance by a program developer.

Description of a program for designating this specific section is exemplified in FIG. 22. A CPU executes "em=new ExplicitMemory( );" in the program so as to secure an external memory region. A designated section is the time when the CPU calls a method "em.enter( );" and then calls a method "em.exit( );" for the generated object "em". The CPU disposes objects "obj1", "obj2" and "obj3" which are generated in this designated section, in the secured external memory region. When the secured external memory region is unnecessary, the CPU calls a method "em.reclaim( );" for the generated object "em" so as to release the external memory region.

One of usages of this processing system is to dispose an object group which has a constant life (a period until an object becomes unnecessary after being generated) in an external memory region. Thereby, flow of an object into a Java heap is reduced, and thereby occurrence of GC is suppressed so as to improve a response performance of the processing system.

In addition, NPL 1 described above also discloses a computer system which applies different memory management methods depending on whether an object has a short life or a long life. This computer system divides a Java heap into a short life region and a long life region, manages age information indicating a lifetime of each object, and individually manages GC of each region. First, the CPU disposes all of generated objects in the short life region. When the short life region is depleted, the CPU starts a GC process, and recovers the objects of the short life region. At this time, the CPU increases the ages of the surviving objects by 1. If this age exceeds a threshold value, the CPU regards an object as an object with a long life, and moves the object to the long life region. The long life object is managed in a separate region in this way, and management of the short life region is reduced, thereby improving an execution performance of a program.

In addition, as a computer system which uses the method of managing objects which are divided into short life objects and long life objects like the computer system disclosed in NPL 1, a system which uses a program point for managing an object life is disclosed in NPL 3. The program point is a point (a position of a code generating an object) where a program generates an object in the program generating the object. The computer system analyzes a life of an object, uses the program point when a long life object is generated, and disposes the object in the long life region from the beginning so as to reduce a GC process or movement of an object, thereby improving an execution performance.

More specifically, in the computer system disclosed in NPL 1, which applies different management methods to short life and long life objects, the CPU records an object and a program point where the object is generated in correlation with each other when executing a program. When an object is moved to the long life region, the CPU manages the object as having a long life, and disposes the generated object in the long life region from the beginning when executing again the program point where the object is generated.

CITATION LIST

Non Patent Literature

[NPL 1] Appel, A. W, Simple generational garbage collection and fast allocation, Software Practice and Experience, 1989.

[NPL 2] Motoki OBATA, Hiroyasu NISHIYAMA, Masahiko ADACHI, Koichi OKADA, Takuma NAGASE, and Kei NAKAJIMA, Explicitly Managed Memory for Java, Journal by the Information Processing Society of Japan, 2009.

[NPL 3] Stephan M. Blackburn, Sharad Singhai, Matthew Hertz, Pretenuring for Java, ACM. Conference on Object-Oriented Programming, Systems, Languages and Applications, 2001.

SUMMARY OF INVENTION

Technical Problem

In the computer system disclosed in NPL 3, it is determined whether an object has a short life or a long life, and the object is managed according to each case; however, in the computer system which performs various processes depending on a life of an object, it is necessary to analyze a lifetime of an object as well as short life and long life thereof. To analyze a life of an object is to analyze a period from generation to unnecessity with respect to an object which is generated at a certain program point, and to correlate the program point and the generated object with a lifetime.

For example, in a computer system which controls generation and deletion of a memory region by a user describing a program, a programmer is required to examine a life of an object and to dispose the object in an external memory region. In this case, the programmer is required to grasp a life of each object, and thus it is difficult to grasp a life of an object in a system using a large-scale framework or the like.

One object of the present invention is to efficiently grasp a life of an object without manual works of a programmer or the like. In addition, another object of the present invention is to improve convenience of memory management of a computer system using a grasped life of an object.

Solution to Problem

A computer includes a storage region in which an object generated by executing a program is disposed; and a control unit that performs execution of the program and releasing of the storage region, wherein the control unit updates time information by a predetermined trigger; acquires information of a program generating an object and the time information at the time of generation of the object which are recorded in a recording device so as to be correlated with each other when the object is generated; detects an object which is unnecessary to execute a subsequent program among objects stored in the storage region and acquires the time information at the time of the detection; and records a difference between the time information at the time of the generation and the time information at the time of the detection in the recording device so as to be correlated with the information of the program.

Advantageous Effects of Invention

According to the present invention, it is possible to achieve an effect of efficiently grasping a life of an object without manual works, and of improving convenience of memory management of a computer system using the grasped life of an object.

Other objects and effects of the present invention will become apparent from the following description and the like.

BRIEF DESCRIPTION OF DRAWINGS

FIG. 4 is a schematic diagram illustrating an example of the object generation table of the embodiment to which the present invention is applied.

FIG. 5 is a schematic diagram illustrating an example of the life information table of the embodiment to which the present invention is applied.

FIG. 17 is a schematic diagram illustrating an external memory management table of the embodiment to which the present invention is applied.

FIG. 21 is a diagram illustrating an example of the program executed by the computer system shown in FIG. 20.

FIG. 22 is a diagram illustrating an example of the program used in a computer system in the related art.

DESCRIPTION OF EMBODIMENTS

Hereinafter, first to third embodiments for implementing the present invention will be described with reference to the drawings.

First Embodiment

Figure 1:
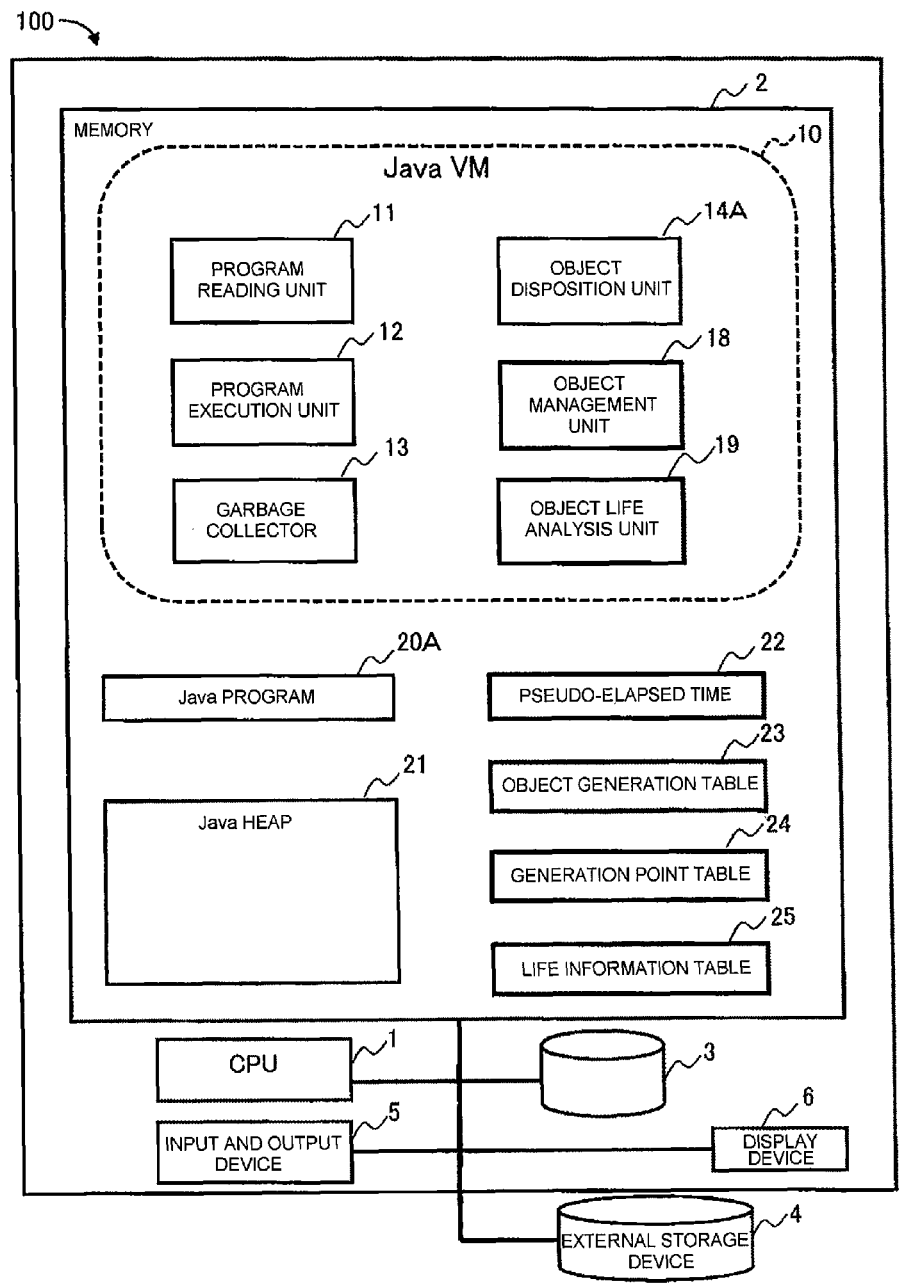
FIG. 1 is a block diagram illustrating a configuration of a first embodiment to which the present invention is applied.

FIG. 1 shows a configuration of a computer system 100 which is a first embodiment to which the present invention is applied. The computer system 100 is constituted by a general-purpose computer apparatus such as a server apparatus which includes a CPU 1, a memory 2 which is a main storage device, and an auxiliary storage device 3. In addition, the computer system 100 includes an external storage device 4 via a network or the like. An input and output device 5 is a device to which a variety of data and threshold values, and the like are input through a user's operation. A display device 6 is a monitor device which can display various tables and process results, and the like used by the computer system 100.

In addition, in the present embodiment, the computer system 100 has a configuration in which a Java VM 10 based on the J2EE standard which is an object-oriented language system is mounted as an AP server.

Further, the present invention is not limited to the configuration of the Java VM 10, and is applicable to a program processing system which can manage an object.

The memory 2 is constituted by and stores regions for storing functional units constituting the Java VM 10, and a variety of data or programs. The Java VM 10 realizes a program reading unit 11, a program execution unit 12, a garbage collector 13, an object disposition unit 14A, an object management unit 18, and an object life analysis unit 19 in cooperation with the CPU 1 and a program, and is configured to include the above-described units. In addition, the Java VM 10 has various functions as well as these functional units. For example, pseudo-elapsed information 22 which is time information updated by a certain trigger is managed by a function of the Java VM 10.

In addition, the memory 2 stores a Java program 20A, the pseudo-elapsed time 22, an object generation table 23, a generation point table 24, and a life information table 26 as a variety of data or programs.

A Java heap 21 is a memory region managed by the Java VM 10 and disposes a generated object therein.

The program reading unit 11 has a function of reading the Java program 20A. The program execution unit 12 has a function of executing commands described in the read Java program 20A so as to generate an object.

Figures 2, 3:
FIG. 2 is a diagram illustrating an example of the program executed in the embodiment to which the present invention is applied.
FIG. 3 is a schematic diagram illustrating an example of the generation point table of the embodiment to which the present invention is applied.

FIG. 2 shows an example of the Java program 20A. The Java program 20A includes a definition of a Test class. The Test class has a definition (second to tenth lines) of a main method. The program execution unit 12 starts executing the main method of the Test class, and then moves an execution point of the program to the third line. The third line indicates a process of generating an object of a Sample class. The program execution unit 12 executes the program point so as to generate an object, and the object is disposed in a region secured from the Java heap 21. When the process in the third line finishes, the program execution unit 12 moves a program point to the fourth line, and continuously executes the program.

When the program execution unit 12 generates an object, the object disposition unit 14A has a function of securing a region of the Java heap 21 and disposing the object therein. In a case where there is no sufficient blank region in the Java heap 21, the garbage collector 13 has a function of executing GC and releasing the Java heap 21.

More specifically, if an object is generated by the program execution unit 12 executing an object generation command described in the Java program 20A, the object disposition unit 14A secures a region corresponding to the object size or more from the Java heap 21. At this time, in a case where the Java heap 21 is insufficient and thus the object disposition unit 14A fails to secure a region, the garbage collector 13 executes GC so as to recover an unnecessary object in the Java heap 21 and to release the region. On the other hand, in a case where the object disposition unit 14A can secure a region from the Java heap 21, the object is disposed in the secured region.

The object management unit 18 has a function of correlating an object generated by the object execution unit 12 with information such as an object type, the name of a method generating the object, and a line number, and time information (a value of the pseudo-elapsed time 22 described later) when the object is generated to manage them. More specifically, the object management unit 18 manages a type, a method name, a line number, and the like regarding a generated object, in the generation point table 24 (FIG. 3), manages generation time information or the like which is time information (the pseudo-elapsed time 22) when the object is generated in an object generation table 27 (FIG. 4), and manages them in correlation with a common ID (generation point ID).

FIG. 3 shows a configuration example of the generation point table 24. In this table, information regarding an object at a time point when the object is generated is registered. When an object is generated, information at a generation time point regarding each object is registered in the generation point table 24 by the object management unit 18. The generation point table 24 includes information such as a generation point ID 271 which specifies information of a generation time point of an object, the type 272 of the generated object, a method name 273 of a method generating the object, and a line number 274 in a method generating the object. For example, the first row given the generation ID "1" in the generation point table 24 indicates that an object "Java.lang.Object" is generated in the line number "line1" within the method of which the method name is "m1".

FIG. 4 shows a configuration example of the object generation table 23. In this table, information regarding time when an object is generated is registered. A generation point ID 231, an object ID 232, and generation time information 233 which is time information at the time of generation, are registered in the object generation table 23. The generation point ID 231 corresponds to the generation point ID 271 of the generation point table 24 (FIG. 3). The object ID 232 is an ID for specifying the type 272 of object stored in the type 272 of the generation point table 24 (FIG. 3). The generation time information 233 indicates time information (the pseudo-elapsed time 22) when an object is generated.

As above, by referring to the object generation table 23 and the generation point table 24, both the information pieces can be correlated with each other. For example, since the generation point ID 231 is "1" in the first line of the object generation table 23, it can be seen that generation point information in which the generation point ID 271 of the generation point table 24 is "1" is correlated with the information of the type of an object="Java.lang.Object" in the line number="line1" of the method name="m1". Similarly, it can be seen that the information is correlated with the generation time information="T1" which is time information when an object is generated in the ID="O1" which specifies the object.

The pseudo-elapsed time 22 is a value managed by the Java VM 10. The Java VM 10 has the pseudo-elapsed time 22 which is managed independently. The pseudo-elapsed time 22 is time updated by a predetermined trigger unlike system time of the computer system 100. The predetermined trigger is a process regarding deletion (invalidation) of data stored in a specific storage region in the memory 2. In the first embodiment, the Java VM 10 increments (T1→T2→T3 . . . ) the pseudo-elapsed time by using execution of a GC process by the garbage collector 13 as a trigger.

The object life analysis unit 19 has a function of determining necessity or unnecessity of an object stored in the Java heap 21 so as to detect an unnecessary object, and, further, of managing a life of the object. Here, the life of the object is a difference between the pseudo-elapsed time 22 (generation time information) when the object is generated or the object is disposed in the Java heap 21 and the current pseudo-elapsed time 22. In addition, the "current" pseudo-elapsed time 22 is the pseudo-elapsed time 22 at a time point when the object life analysis unit 19 determines necessity or unnecessity of an object and thereby detects an unnecessary object.

The determination of necessity or unnecessity of an object is performed by the object life analysis unit 19 analyzing whether or not an object disposed in the Java heap 21 is an object unnecessary to execute a subsequent program. The object life analysis unit 19 determines that an object necessary to execute a subsequent program is an object which can be reached by referring to stacking during execution of a program, register, or the like, and the other objects are objects unnecessary to execute the subsequent program. This process has the same process procedures as, for example, the determination process of necessity or unnecessity of an object which is performed when the garbage collector 13 executes GC. An object determined as being unnecessary is detected as an unnecessary object by the object life analysis unit 19.

In addition, a life of an object is calculated based on the pseudo-elapsed time 22 when an object which is detected as an unnecessary object by the object analysis unit 19 is generated and the pseudo-elapsed time 22 when the object is detected as an unnecessary object. Specifically, the object analysis unit 19 refers to the object generation table 23 and acquires the generation time information 233 using the object ID 232 of an object detected as an unnecessary object as an index. Next, the pseudo-elapsed time 22 at the current time point is acquired, a difference between both of them is calculated, and the difference is set as a life of the detected unnecessary object. The calculated life of the object is managed in the life information table 26.

FIG. 5 shows a configuration example of the life information table 26. The life information table 26 includes a generation point ID 261 and a life 262. The generation point ID 261 corresponds to the generation point ID 271 of the generation point table 24 and the generation point ID 231 of the object generation table 23. The object analysis unit 19 acquires the generation point ID 231 using the object ID 232 (FIG. 4) used when calculating a life of the object as an index, so as to be registered in the life information table 26 in correlation with the calculated object life 262.

The above description relates to the configuration of the computer system 100. Next, with reference to FIGS. 6 to 8, a process operation by the computer system 100 will be described.

Figure 6:
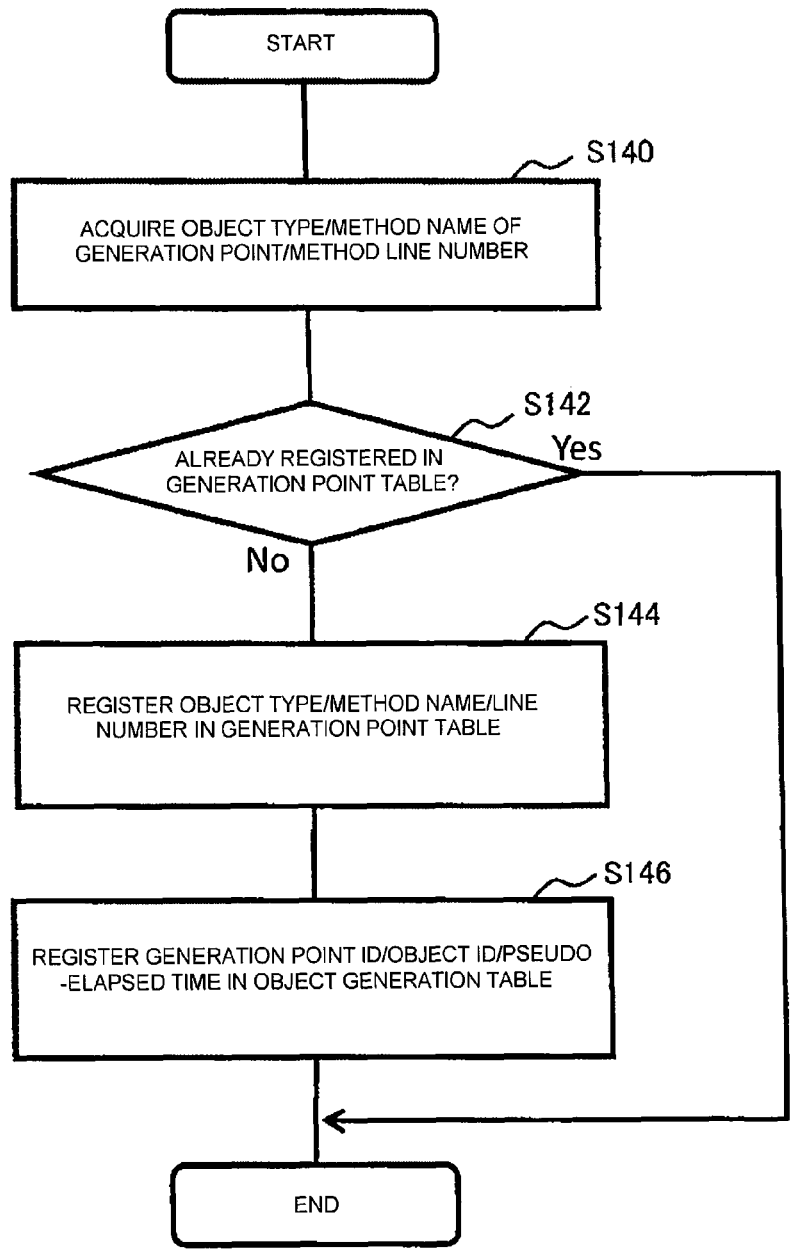
FIG. 6 is a flowchart illustrating a process by an object management unit of the embodiment to which the present invention is applied.

FIG. 6 shows a process by the object management unit 18.

When the program execution unit 12 generates an object, the object management unit 18 acquires information (the type of the object, the method name, and the line number) regarding the object from the program execution unit 12 (S140).

Next, the object management unit 18 checks whether the acquired values are registered in the generation point table 24 (S142). If the values have been registered (S142: Yes), the object management unit 18 finishes the present process, and, if the values have not been registered (S142: No), the object management unit 18 generates a generation point ID 271 for specifying the information regarding the object, registers the generation point ID in the generation point table 24 and registers the type 272 of the object, the method name 273, and the line number 274 acquired from the program execution unit 12 in the generation point table 24 (S144).

Successively, the object management unit 18 acquires the pseudo-elapsed time 22, registers the generation time information 233 in the object generation table 23, further, registers the corresponding generation point ID 231 and object ID 232 together (S146), and finishes the process.

Figure 7:
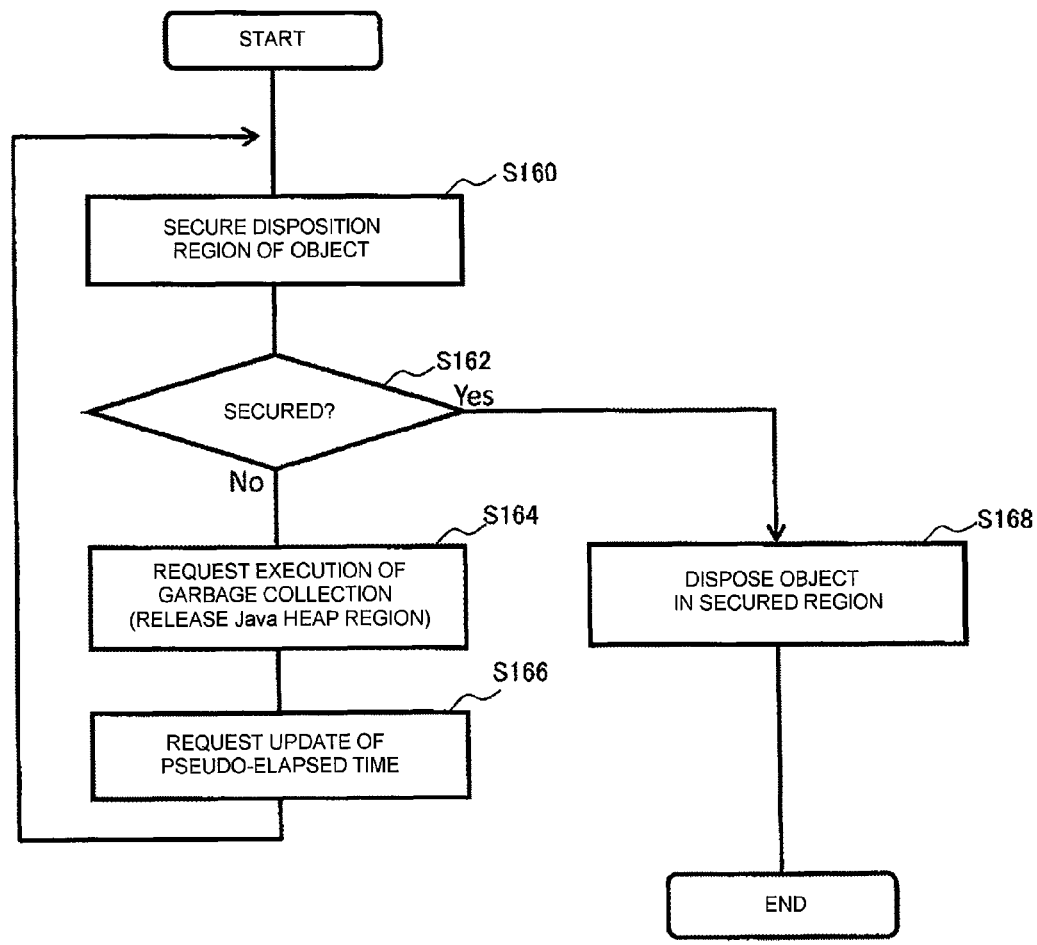
FIG. 7 is a flowchart illustrating a process by an object disposition unit of the embodiment to which the present invention is applied.

FIG. 7 shows a process flow by the object disposition unit 14A.

First, the object disposition unit 14A secures a region corresponding to the size of the generated object from the Java heap 21 (S160). If a region corresponding to the size is insufficient on the Java heap 21 and thus region securing is not successful (S162: No), the object disposition unit 14A transmits a request for execution of GC to the garbage collector 13 (S164). The garbage collector 13 which has received the execution request recovers objects on the Java heap 21, and thereby the Java heap 21 is released. In S164, the object disposition unit 14A transmits a request for updating the pseudo-elapsed time 22 to the Java VM 10 at the timing when the garbage collector 13 finishes the recovery of objects (S166). The Java VM 10 which has received the update request increments (adding 1) the pseudo-elapsed time 22 so as to update the pseudo-elapsed time 22. Successively, the process returns to S160.

If a region corresponding to the size of the generated object is secured on the Java heap 21 (S162: Yes), the object disposition unit 14A disposes the object in the secured region and finishes the process (S148).

Figure 8:
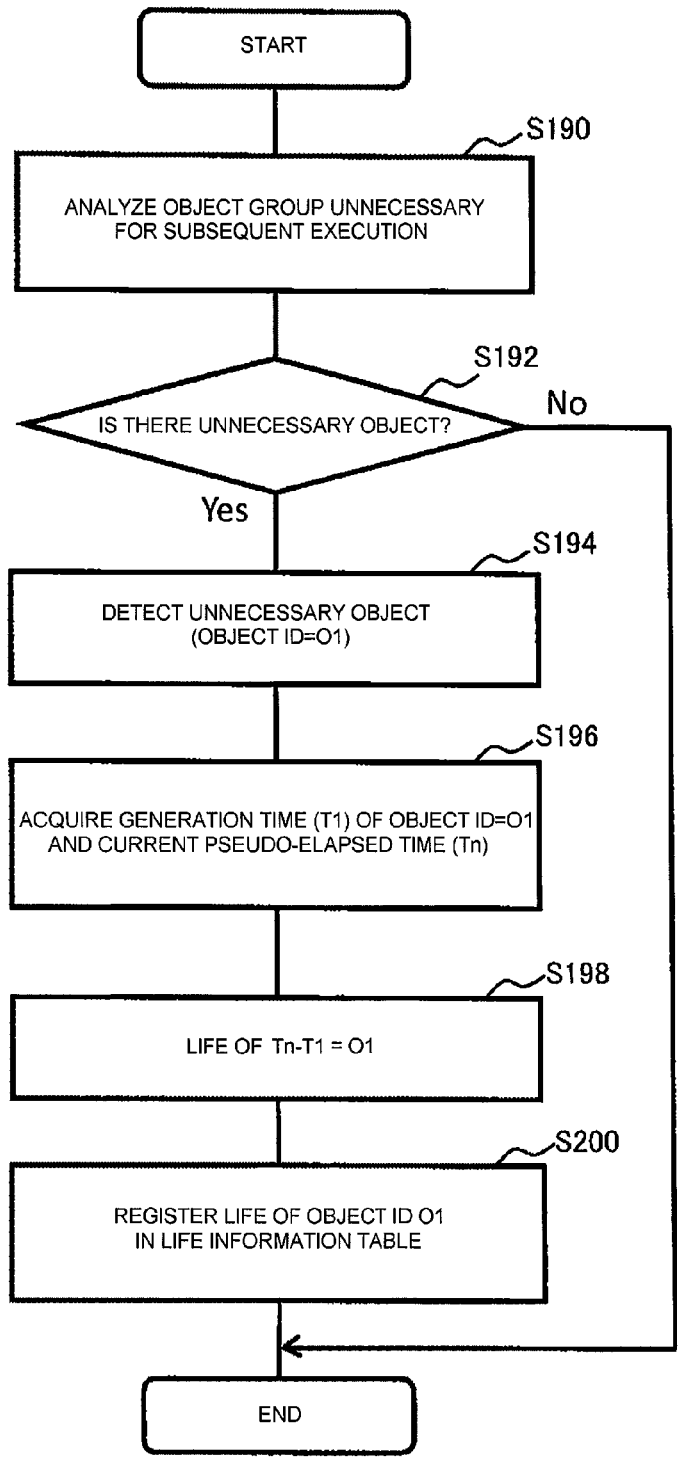
FIG. 8 is a flowchart illustrating a process by an object life analysis unit of the embodiment to which the present invention is applied.

FIG. 8 shows a process flow by the object life analysis unit 19.

The object life analysis unit 19 analyzes whether or not an object disposed in the Java heap 21 is necessary to execute a subsequent program (S190). The object life analysis unit 19 performs the analysis by determining (S192) whether or not the object can be reached by referring to staking during execution of a program, a register or the like. An object which cannot be reached is determined as being an object unnecessary to execute a subsequent program.

If the unnecessary object is detected (S192: Yes), the object life analysis unit 19 extracts the object (S194). The object life analysis unit 19 acquires the generation time information 233 (for example, "T1") from the object generation table 23 using the object ID (for example, "O1") of the extracted object as an index, and acquires the pseudo-elapsed time 22 ("Tn") at the current time point (S196). Next, the object life analysis unit 19 sets a difference between Tn and T1 as a life of the object ID "O1" (S198).

In addition, the object life analysis unit 19 acquires the generation point ID 231 corresponding to the object ID "O1" from the object generation table 23 so as to be correlated with the calculated life 264 and to be registered in the life information table 26 (S200).

A description will be made of the overall flow in which the computer system 100 having the configuration and performing the process manages a life of an object with reference to FIG. 9. In addition, in the example of FIG. 9, the description will be made by assuming that the Java program 20A (FIG. 2) is executed.

Figure 9:
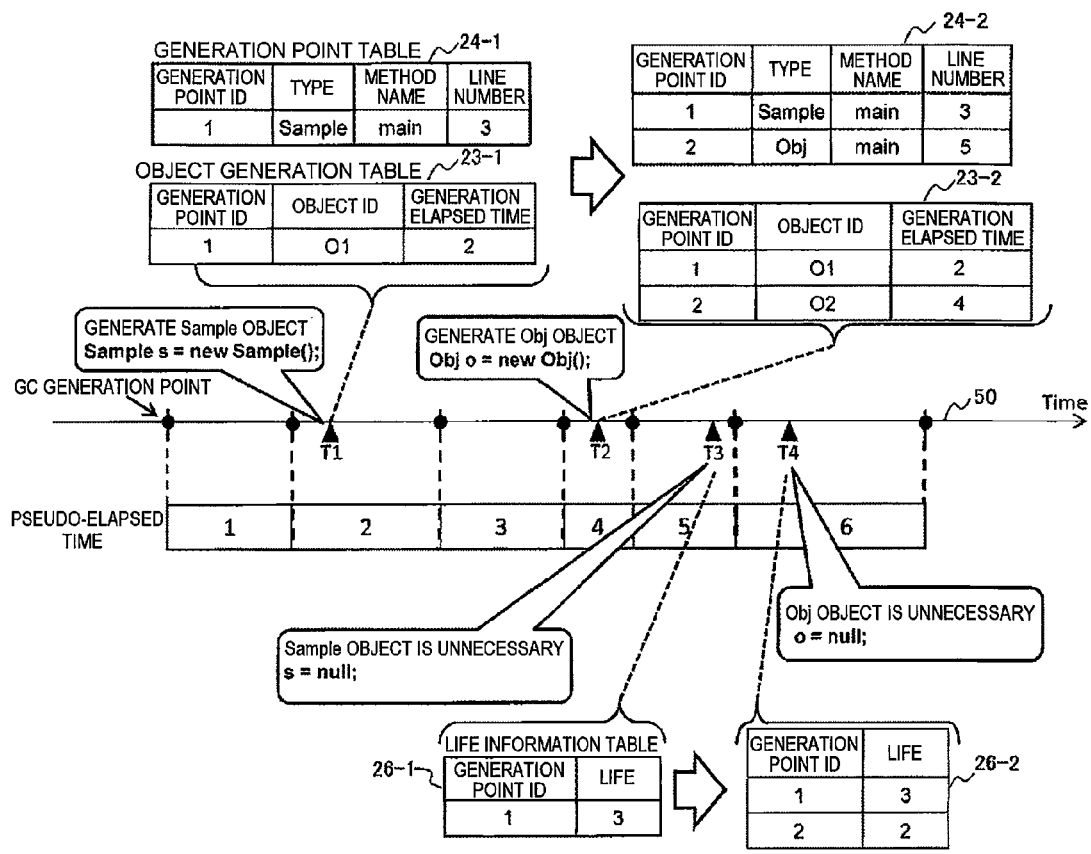
FIG. 9 is a schematic diagram illustrating an example of the operation process by a computer system of the embodiment to which the present invention is applied.

FIG. 9 schematically shows a flow of the overall processes by the computer system 100. In FIG. 9, the transverse axis 50 expresses a time axis. In addition, timing of GC which occurs during execution of the program is plotted on the transverse axis 50. A state is shown in which the pseudo-elapsed time 22 increases by 1 according to the occurrence of GC. The black triangle mark in the figure indicates a time point when the Java program 20A executes a program so as to generate an object, and four time points T1, T2, T3 and T4 are shown. A code of each balloon indicating T1 to T4 is contents of a line in the Java program 20A which is executed at each time point. The generation point table 24-1 and the object generation table 23-1 in the figure indicate contents of the respective tables when the Java program 20A is executed at T1, the generation point table 24-2 and the object generation table 23-2 in the figure indicate contents of the respective tables when the Java program 20A is executed at T2, and a state in which each table transits from T1 to T2 is indicated. Similarly, the life information tables 26-1 and 26-2 shown in the lower part of the figure indicate a transition state from T3 to T4.

At the time T1, when the program execution unit 12 executes the third line "Sample s1=new Sample( );" of the Java program, the program execution unit 12 generates a Sample object "s". At this time, the object management unit 18 registers the type "Sample" of the generated object, the method name "main" of the generation point, and the line number "3", and the generation point ID "1" for specifying them in the generation point table 24-1. In addition, the object management unit 18 registers the generation point ID "1", the object ID "O1", and the generation time information="2" in the object generation table 23-1.

Successively, the program execution unit 12 makes the execution of the Java program 21 progress, and at T2, executes the fifth line "//any operations" of the Java program 20A so as to generate an Obj object "o". In the same manner, also here, the object management unit 18 registers information at the generation point of the Obj object "o" in the generation point table 24-2 and the object generation table 23-2.

Further, when the program execution unit 12 makes the process progress, and executes the eighth line of the Java program 20A at the time T3, the Sample object "s" created at the time T1 is made to be unnecessary. The object life analysis unit 19 detects that the Sample object "s" is unnecessary. Using the ID "O1" for specifying the Sample object, the generation point ID "1" and the generation time information="2" are acquired from the object generation table 23-2. In addition, the object life analysis unit 19 acquires the pseudo-elapsed time 22="5" at the current time point, calculates a difference "3" with the acquired generation time information="2", and sets the difference as a life. The object life analysis unit 19 registers the generation point ID "1" and the life "3" in the life information table 26-1 so as to be correlated with each other.

In addition, when the program execution unit 12 executes the ninth line "//any operations" of the Java program 20A, the Obj object "o" is made to be unnecessary. In the same manner as in the case of T3, the object life analysis unit 19 detects the unnecessary object and a life thereof which are registered in the life information table 26-2. In the above-described way, the object management unit 18 and the object life analysis unit 19 create the generation point table 24, the object generation table 23, and the life information table 26, thereby managing a life of an object.

As described above, according to the first embodiment, it is possible to dynamically manage a life of an object analyzed through manual works in the related art or a life of an object in a large scale system in which analysis is difficult.

Particularly, since a life of an object can be dynamically managed, it is applied to various memory management techniques such as deleting a specific object or moving an object to a memory region which is not a GC target by using the life information, and thereby an effect of further improving process efficiency and convenience of the various memory management techniques can be expected.

In addition, it is possible to grasp at which position on a program an object is generated and to thereby mount a special process in the object.

Modified Example of First Embodiment

In the above-described first embodiment, in a case where information at a generation point of an object generated by the program execution unit 12 has already been registered in the generation point table 24 and the object generation table 23, the information is configured not to be registered (refer to FIG. 6: S182). This configuration has an effect of reducing an analysis process time since a life of an object generated at the same generation point is analyzed only once by the object life analysis unit 19.

Here, it is considered that there are cases where even objects generated at the same generation point have different lives depending on load circumstances of the computer system 100. In these cases, it is considered that the objects generated at the same generation point are also registered in the object generation table 23 or the like, and life analysis of the objects is performed. Hereinafter, as a modified example of the first embodiment, a description will be made of a configuration in which, even if an object generated at the same generation point has already been registered in the object generation table 23 or the like, information regarding the object is registered in the object generation table 23 and the object life information table 26.

Figure 10:
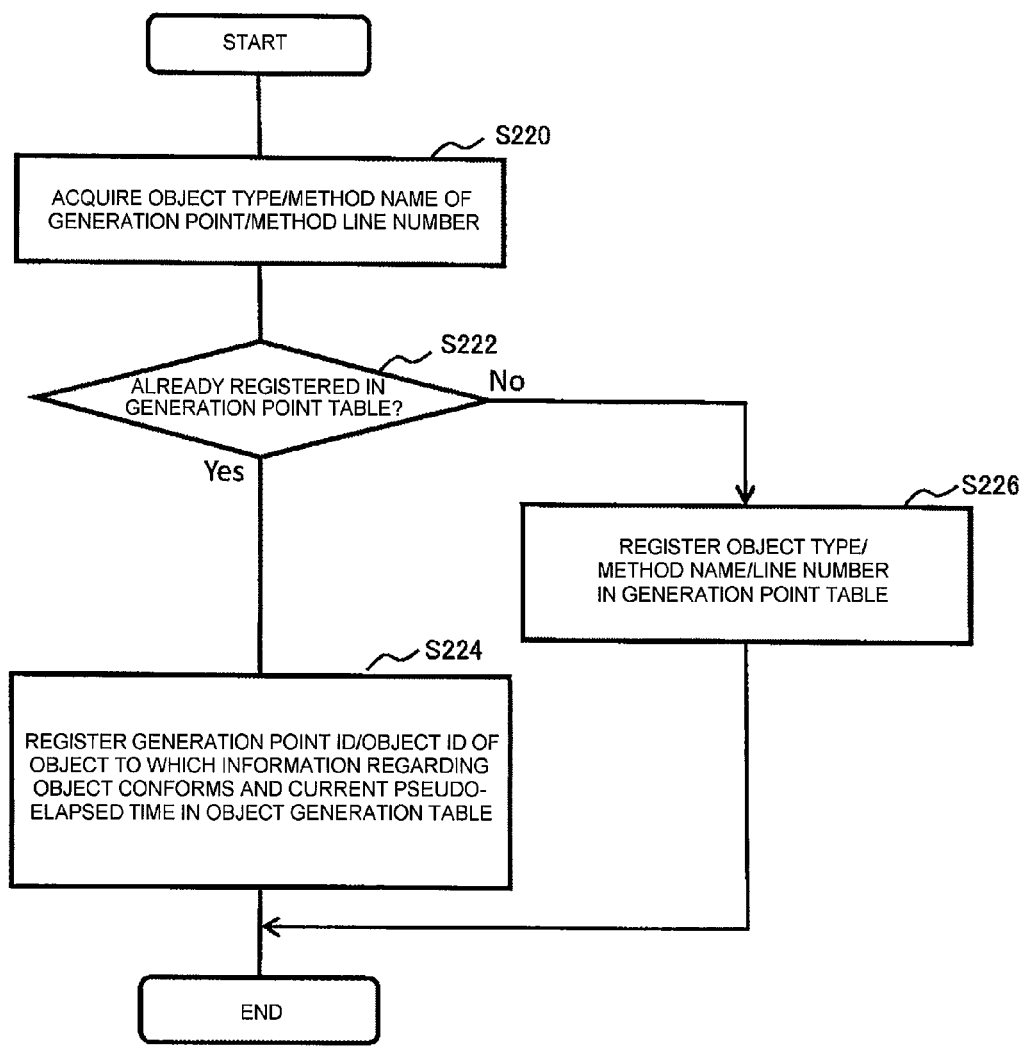
FIG. 10 is a flowchart illustrating a process by an object management unit in a modified example of the first embodiment to which the present invention is applied.

FIG. 10 shows a process by the object management unit 18 in the modified example.

When the program execution unit 12 generates an object, the object management unit 18 acquires information (the type of the object, the method name, and the line number) regarding the object from the program execution unit 12 (S220). The object management unit 18 determines whether or not the same values have been registered in the generation point table 24 based on the values (S222). If it is determined that the values have not been registered (S222: No), the object management unit 18 registers information thereof in the generation point table 24 and finishes the present process.

If it is determined that the values have been registered (S222: Yes), the object management unit 18 acquires the generation point ID 271 corresponding to the same values registered in the generation point table 24. The object management unit 18 reads the generation point ID 231 and the object ID 232 from the object generation table 23 based on the generation point ID 271, so as to be correlated with the current pseudo-elapsed time 22 as the generation time information 233 and to be newly registered in the object generation table 23, and finishes the present process.

Figures 11, 12:
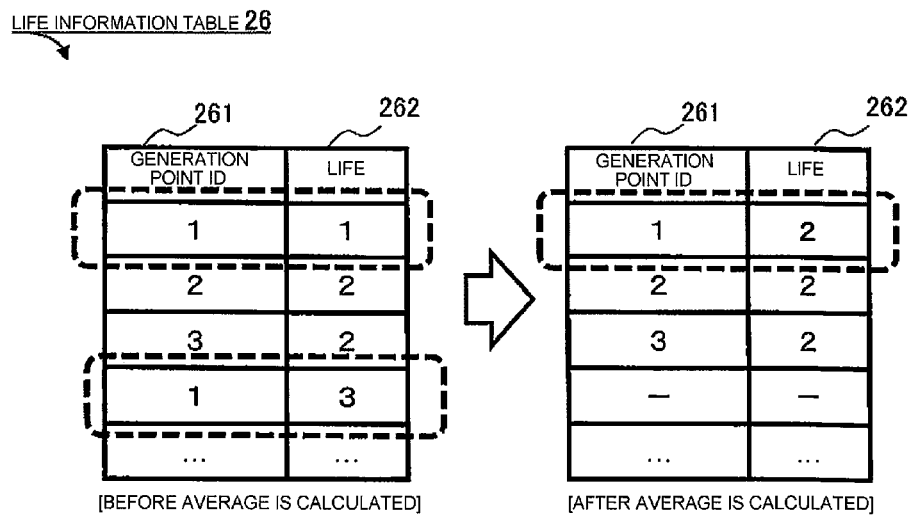
FIG. 11 is a schematic diagram illustrating an object generation table in a modified example of the first embodiment to which the present invention is applied.
FIG. 12 is a schematic diagram illustrating a generation point table of in a modified example of the embodiment to which the present invention is applied.

FIG. 11 shows a state of the object generation table 23 when an object generated at the same generation point is registered through the process of FIG. 10. Both of the generation point IDs 231 corresponding to the object IDs 232 "O1" and "O4" are "1". In other words, both of them indicate that objects with the same object type, method name and line number are generated at different pseudo-elapsed information 22 (generation time information 233).

The object life analysis processing unit 19 analyzes a life of the object based on the object generation table 23 created in this way. In the object generation table 23 shown in FIG. 11, the object life analysis unit 19 performs life analysis of the object so as to obtain the life information table 26 as shown in FIG. 12. In FIG. 12, in the first row, the generation point ID 261 is "1" and the life 262 is "1", whereas, in the fourth row, the generation point ID 262 is "1" and the life 262 is "3".

However, the object life analysis unit 19 cannot determine a unique life of an object generated at a certain generation point in this state. Therefore, the object life analysis unit 19 calculates an average of the lives with the same generation point ID 261 in the life information table 26 so as to calculate a life corresponding to the generation point ID, and correlates the generation point with the life of the object one to one so as to be held in the life information table 26.

According to the above-described modified example, since life analysis is performed for each of objects generated at the same generation point, and an average value thereof is set as a life of the objects generated at the same generation point, there is an effect in which the accuracy of the life analysis can be relatively improved.

Second Embodiment

Next, the second embodiment of the present invention will be described. In the first embodiment and the modified example thereof, the pseudo-elapsed time 22 is updated using GC occurrence of the garbage collector 13 as a trigger. In contrast, the second embodiment has one of features in which an update trigger of the pseudo-elapsed time 22 is timing when an object disposition unit 14B secures a region with a specific size for securing an object from the Java heap 21.

Figure 13:
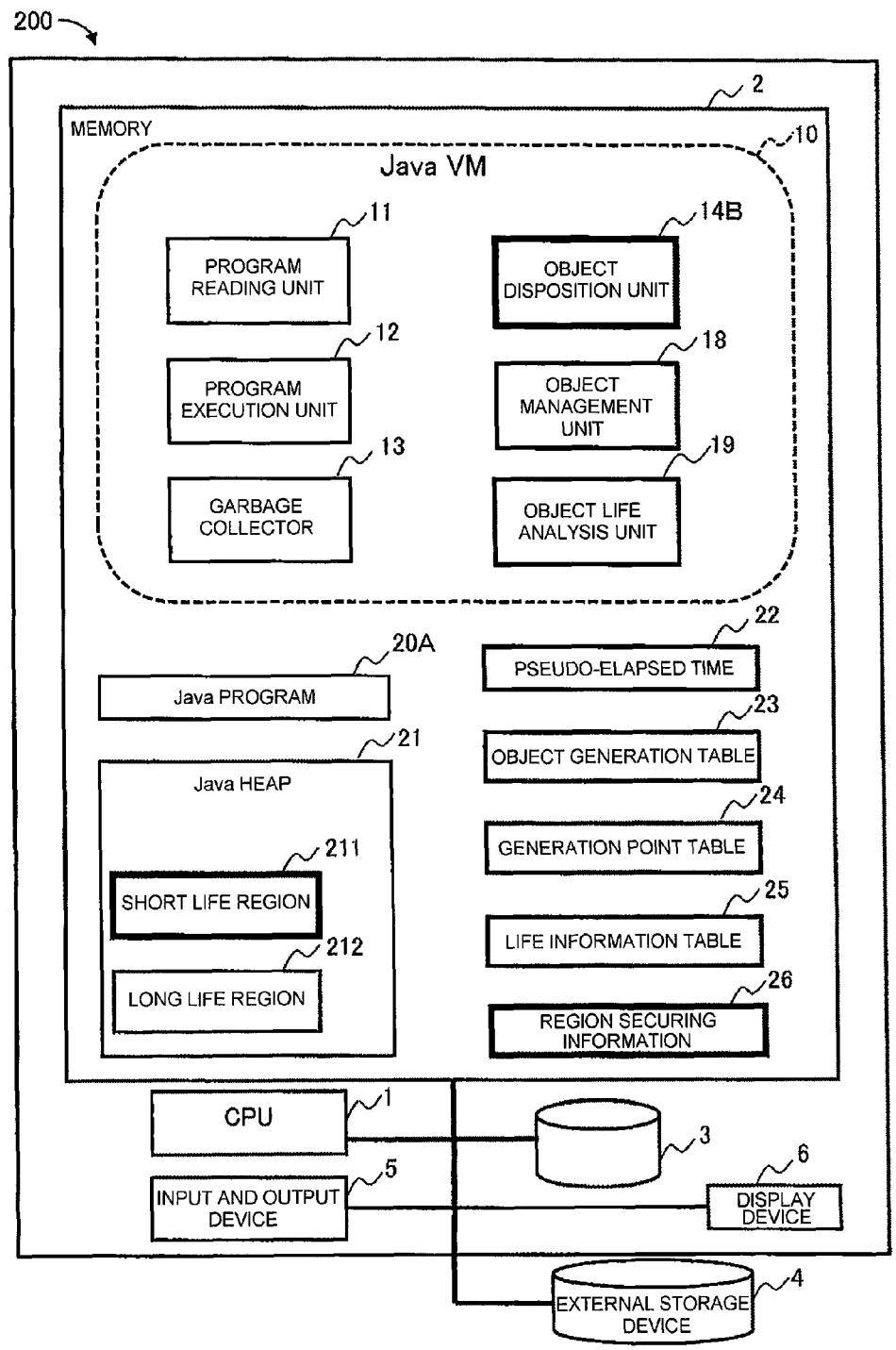
FIG. 13 is a block diagram illustrating a configuration of a second embodiment to which the present invention is applied.

FIG. 13 shows a configuration of a computer system 200 which is the second embodiment to which the present invention is applied. The computer system 200 has a configuration in which a function of the object disposition unit 14B is different from that of the object disposition unit 14A of the first embodiment, and region securing information 26 is further provided. In addition, in the second embodiment, a particular description will be made of a case where the Java heap 21 has a short life region 211 in which a short life object is stored and a long life region 212 in which a long life object is stored. Further, the computer system 200 outputs life information file 00 including contents of the object generation table 23, the generation point table 24 and the life information table 25 to the external storage device 4.

Configurations of the other functional units and the like are the same as in the first embodiment. Hereinafter, a difference from the first embodiment will be mainly described.

The object disposition unit 14B has a function of generating an object which is required by the program execution unit 12 executing the Java program 20A and disposing the object in a region with the object size, secured in the short life region 211 of the Java heap 21, in the same manner as the object 14A of the first embodiment.

The object disposition unit 14B has a function of updating a secured memory capacity in a cumulative manner in the region securing information 26. Here, the object disposition unit 14B disposes a generated object in the secured region, then adds a region securing capacity this time to the region securing information 26, resets (the capacity "0") a region cumulative size if a cumulative value exceeds a threshold value (capacity threshold value), and adds 1 to the pseudo-elapsed time 22 which is updated.

Conversely, in a case of failing to secure a region of the short life region 211, the object disposition unit 14B transmits a request for executing GC to the garbage collector 13 so as to release the short life region 211.

The region securing information 26 is information indicating a capacity secured by the object disposition unit 14B on the short life region 211 of the Java heap 21. The capacity is added in a cumulative manner until the object disposition unit 14B resets the region securing information 26. A capacity threshold value when the capacity is added to the region securing information 26 in a cumulative manner is preferably at least equal to or less than the capacity of the short life region 211. In addition, the capacity threshold value may be set in the computer system 200 as a fixed value, or may be input so as to be variable via the input and output device 5.

A process operation by the computer system 200 with the above-described configuration will be described with reference to FIGS. 14 and 15.

Figure 14:
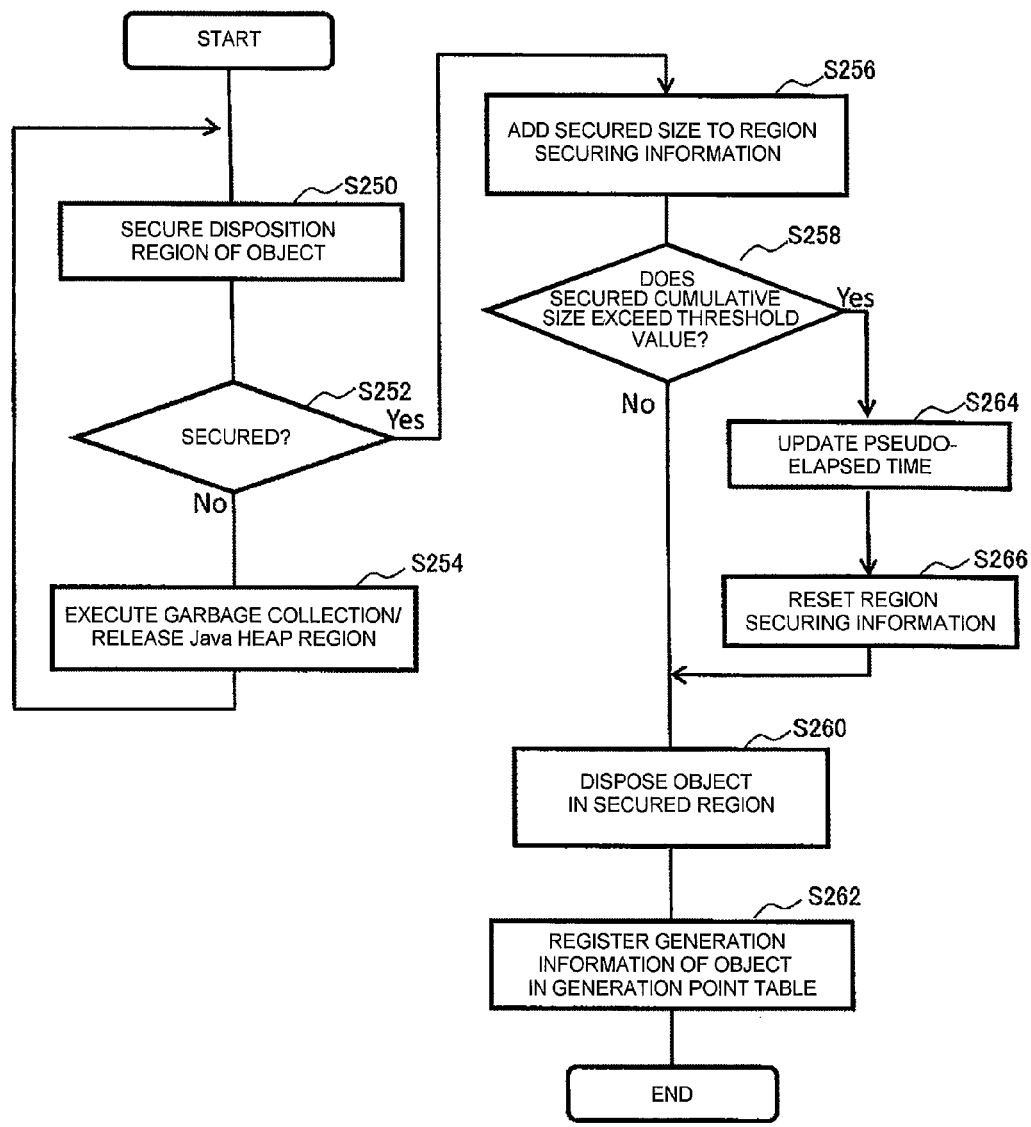
FIG. 14 is a flowchart illustrating a process by an object disposition unit of the second embodiment to which the present invention is applied.

FIG. 14 shows a process flow by the object disposition unit 14B.

The object disposition unit 14B secures a region corresponding to a size of a generated object from the short life region 211 of the Java heap 21 in response to an object generation request from the program execution unit 12 (S250).

The object disposition unit 14B determines whether or not securing of a region is successful (S252). In a case of failing to secure a region (S252: No), the object disposition unit 14B requests the garbage collector 13 to execute GC so as to release a region of the Java heap 21 (S254). Thereafter, the object disposition unit 14B returns the process to S200. On the other hand, in a case of succeeding in securing a region (S252: Yes), the object disposition unit 14B adds the secured size to the region securing information 26 (S256).

Successively, the object disposition unit 14B determines whether or not a capacity of the region securing information 26 to which the capacity secured this time is added exceeds the capacity threshold value (S258), and the flow proceeds to a process in S210 if it is determined that the capacity does not exceed the capacity threshold value (S260: No). In contrast, if it is determined that the capacity of the region securing information 26 to which the capacity secured this time is added exceeds the capacity threshold value (S258: Yes), the flow proceeds to a process in S264.

The object disposition unit 14B adds 1 to a value of the pseudo-elapsed time 22 at the current time point so as to update the pseudo-elapsed time 22 (S264). Then, the object disposition unit 14B resets ("0") a cumulative secured capacity of the capacity securing information 26 (S266).

In a case of No in S258 or after S216, the object disposition unit 14B disposes the generated object in the secured region (S260), transmits an instruction for registering generation information of the object which is generated and is disposed this time to the object management unit 18 (S262), and finishes the process.

A description will be made of the overall operation of the computer system 200 having the object disposition unit 14B which performs the above-described operation process.

Figure 15:
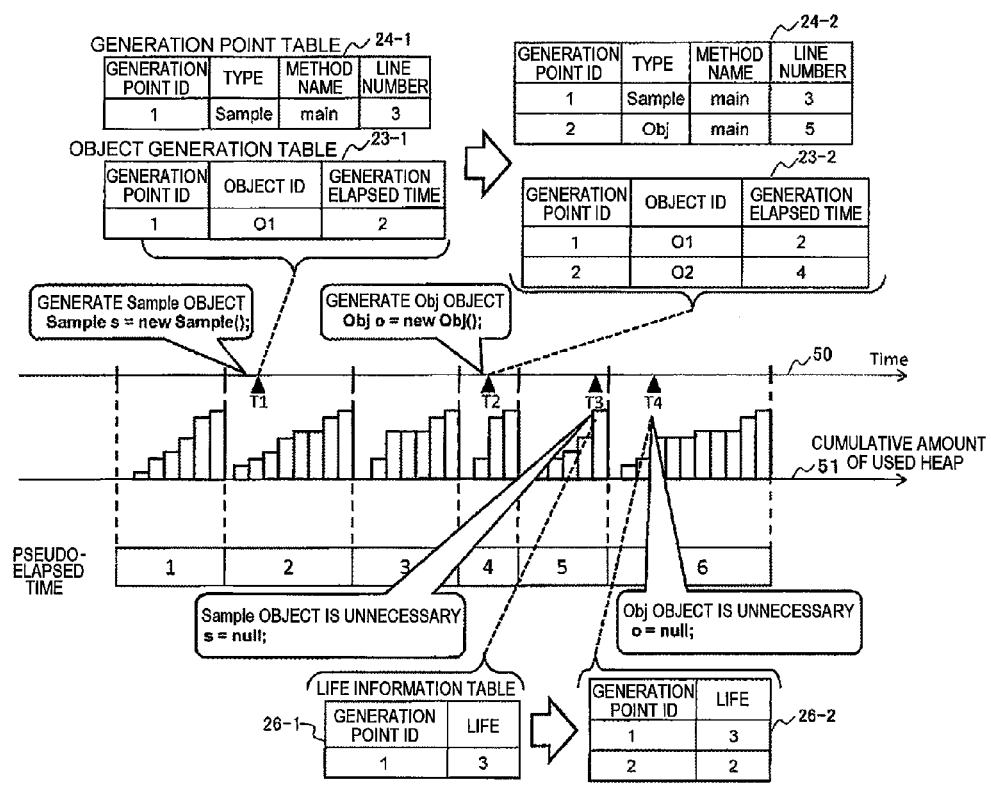
FIG. 15 is a schematic diagram illustrating an operation process by a computer system of the second embodiment to which the present invention is applied.

FIG. 15 schematically shows a process executed by the computer system 200. This figure has contents similar to the contents shown in FIG. 9 of the first embodiment. In FIG. 15, a secured heap cumulative amount 51 indicates transition of a secured amount of the short life region 211 at each time interval of the pseudo-elapsed time 22 with the bar graph. In addition, an executed program is the Java program 20A, and a code in each balloon, and transition of the generation point table 24, the object generation table 23 and the life information table 26 in FIG. 15 are the same as in FIG. 9 of the first embodiment.

As described above, according to the computer system 200 of the second embodiment, it is possible to manage a life of an object according to an object capacity secured in the short life region 211 of the Java heap 21. Particularly, in the computer system 200, update of the pseudo-elapsed time 22 can be more flexibly changed by setting a threshold value, and thus there is an effect of executing life of an object with higher accuracy. Therefore, there can be an expectation of an effect in which convenience is further improved than in the computer system 100 of the first embodiment which updates the pseudo-elapsed time 22 using execution of GC as a trigger.

In addition, the configuration in which a capacity threshold value of the region securing information 26 can be flexibly set so as to update the pseudo-elapsed time 22 can also be used to reduce an update process of the pseudo-elapsed time 22 in a case where life information is sufficient even with low accuracy, and thus there is an effect of reducing overhead of this update process.

In addition, although the computer system 200 of the second embodiment is configured to target the short life region 211 on the Java heap 21 and manage a life of an object, the present invention is not limited to this configuration, and there may be a configuration in which the long life region 212 is targeted and a life is managed.

Third Embodiment

Next, a computer system 300 which is the third embodiment to which the present invention is applied will be described.

Figure 16:
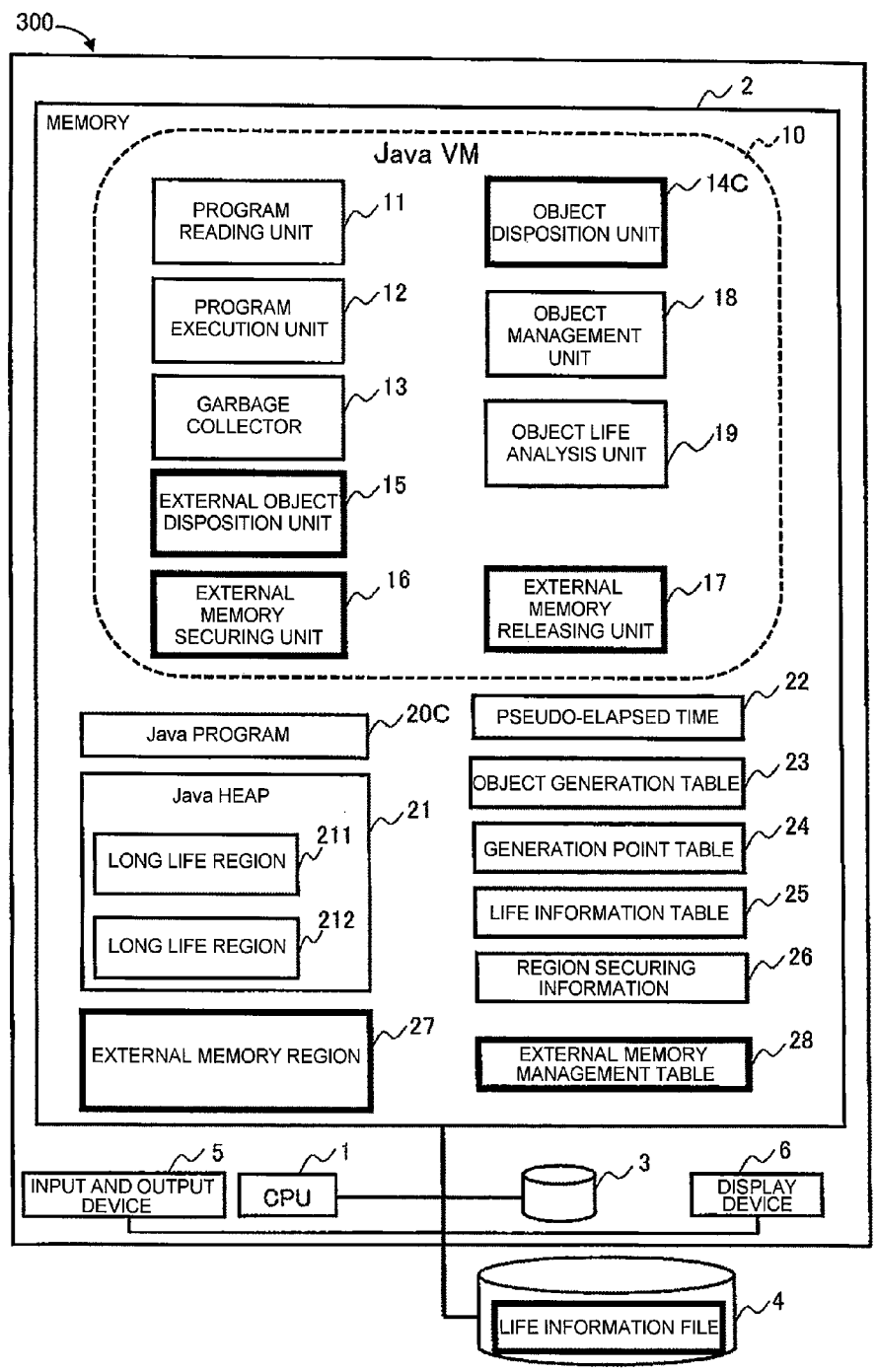
FIG. 16 is a block diagram illustrating a configuration of a third embodiment to which the present invention is applied.

FIG. 16 shows a configuration of the computer system 300. The computer system 300 substantially has a configuration common to the configuration of the computer systems 100 and 200 of the first and second embodiments, and, further has a memory region (hereinafter, referred to as an "external memory region") which is not a management target of GC as one feature of the configuration thereof. A Java machine such as the Java VM 10 typically has the Java heap 21 as a memory region storing an object. As described above, the Java heap 21 is a memory region which is a management target of GC by the garbage collector 13. In contrast, an external memory 25 is a memory region which is not a management target of GC by the garbage collector 13.

The computer system 300 performs a process whether a disposition destination is set to an external memory region 27 or the Java heap 21 in relation to a life of an object as one of features. Further, when objects are disposed in the external memory region 27, the computer system 300 disposes objects having similar lives in the same external memory region 27 as one of features.

Hereinafter, a difference from the first and second embodiments will be mainly described.

First, the computer system 300 includes the external memory region 27 and an external memory management table 28 in the memory 2 in addition to the configuration of the computer system 200 of the second embodiment. Further, the computer system 300 includes an object disposition unit 14C, an external object disposition unit 15, an external object disposition unit 16, and an external memory releasing unit 17 as functional units of the Java VM 10.

The external memory region 27 is a memory region which is not a target of GC and in which an object generated by the program execution unit 12 can be disposed. In addition, in FIG. 16, for simplicity, the external memory region 27 is shown by a single unified region but can be secured and managed as a plurality of regions by a function of the external memory securing unit 16 described later. In other words, the external memory region 27 is a memory region which can be secured in a plurality and can be released separately.

The object disposition unit 14C is a functional unit which generates and disposes an object in the same manner as the object disposition units 14A and 14B of the first and second embodiments, but is different from them in that a process starts by not using an object disposition request from the program execution unit but using a call command from the external object disposition unit 15 described later as a trigger. The other configurations are the same.

The external object disposition unit 15 is called using an object disposition command from the program execution unit 12 as a trigger. When the object disposition command is received, the external object disposition unit 15 has a function of determining whether or not generation information regarding a disposed object has already been registered in the generation point table 24. More specifically, the type of disposed object, a method name, and a line number of a generation point are acquired from the program execution unit 12, and the generation point table 24 is searched based on them, thereby performing the determination. In a case where this generation information regarding the disposed object has been recorded in the generation point table 24, a corresponding life is acquired from the life information table 26 on the basis of a generation point ID. If the acquired life exceeds a predetermined threshold value, the process is passed to the external memory securing unit 16.

On the other hand, in a case where the acquired life is equal to or less than the predetermined threshold value or generation information regarding a generated object has not been registered in the generation point table 24, the process is passed to the object disposition unit 14C.

Here, the predetermined threshold value may be set to any value via the input and output device 5 by a user, or may be set in the system as a fixed value in advance. In the third embodiment, the user can set any value.

The external object securing unit 16 has a function of receiving a process request from the external object disposition unit 15, securing a region in the external memory region 27 by referring to pseudo-elapsed time and the external memory management table 28 in which information regarding a life of a generated object is recorded, and performing update or the like of the external memory management table 28.

FIG. 17 schematically shows a configuration of the external memory management table 28. The external memory management table 28 is a table in which generation time information 281 (pseudo-elapsed time 22) at a time point when the external memory region 27 is secured, a life 282 of an object which is a target disposed therein, and an external memory ID 283 for specifying the external memory region 27 are recorded so as to be correlated with each other. In the example of the first row in FIG. 17, the external memory region 27 of which the external memory ID is "ex1" indicates that it is secured when the generation time information 281 (pseudo-elapsed time 22) is "1", and a life of an object disposed therein is "1". Similarly, pseudo-elapsed time, a life of an object, and an external memory ID are managed so as to be correlated with each other in the external memory management table 28, and thereby it is possible to dispose objects having the same life, generated at the same pseudo-elapsed time 22, in the same external memory.

In addition, in the third embodiment, an example in which the pseudo-elapsed time 22 when an object disposed in the external memory region 27 is generated and a life of the object conform to the generation time information 281 and the life 282 registered in the external memory management table 28 is described; however, they may not completely conform. For example, there may be a configuration in which a value of the pseudo-elapsed time 22 or a life is regarded as conforming within a predetermined width (allowance).

The external object releasing unit 17 has a function of performing a releasing process of the external memory region 27. Here, the releasing of the external memory region 27 includes all the meanings such as invalidation of an address of the external memory region 27, invalidation of an address and deletion of disposed data (object), and no invalidation of an address and deletion of only data (object).

The releasing process of the external memory region 27 is executed by various triggers such as a releasing instruction from a user input via the input and output device 5, the time when there are no other objects referred to by an object disposed in the external memory region 27 or no other objects which refer to the object disposed in the external memory region 27, or finishing of the Java program 21 executed by the program execution unit 12.

In addition, on the external memory management table 28, the external object releasing unit 17 invalidates (deletes) the external memory ID 283 of the external memory region 27 which is a releasing target, and the generation time information 281 and the life 282 corresponding thereto from the external memory management table 28 when releasing the external memory region 27.

Next, a description will be made of a process operation by each processing unit of the computer system 300.

Figure 18:
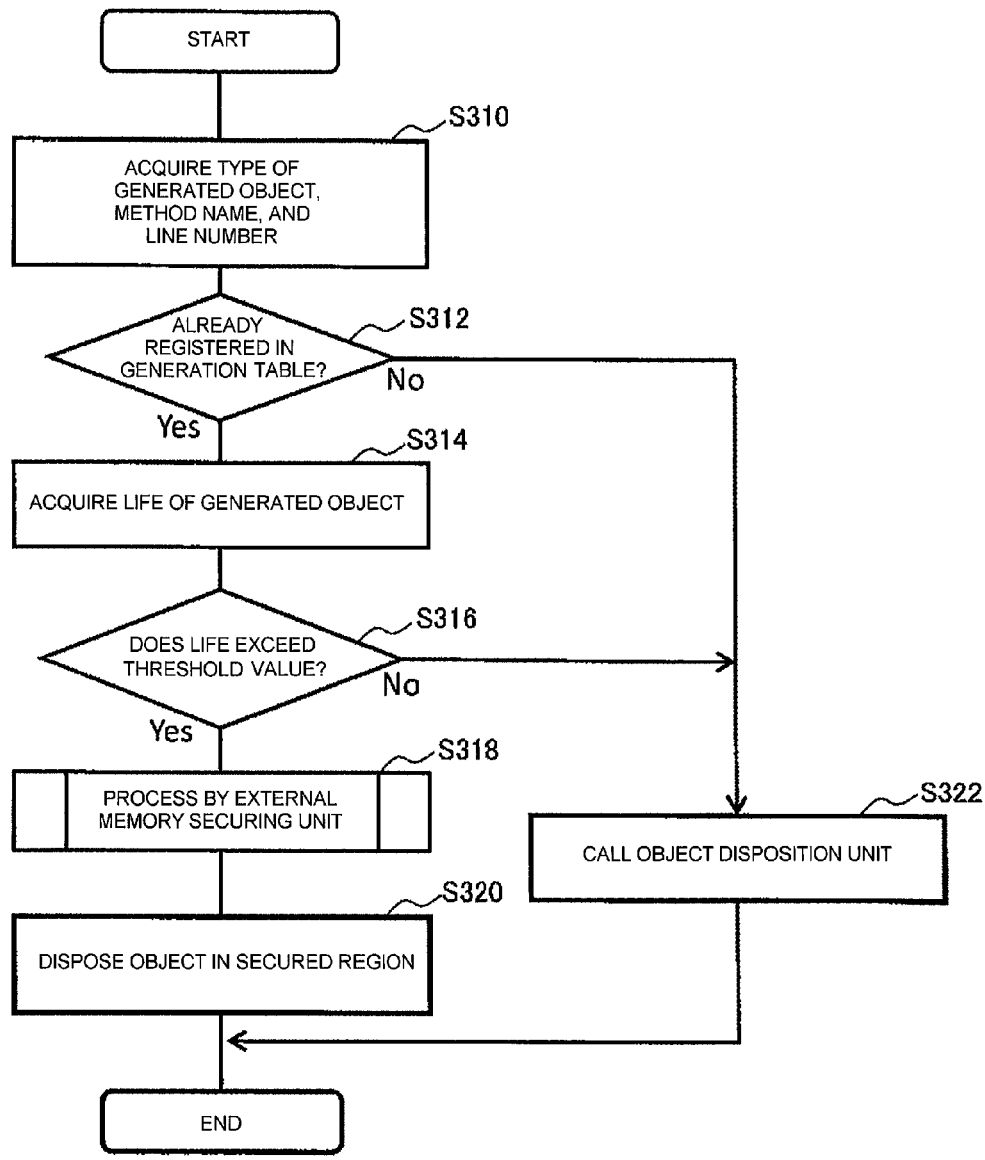
FIG. 18 is a flowchart illustrating a process by an external object disposition unit of the embodiment to which the present invention is applied.

FIG. 18 shows a process flow by the external object disposition unit 15.

First, the external object disposition unit 15 acquires the type of a generated object, a method name, and a line number from the program execution unit 12 (S310).

Next, the external object disposition unit 15 searches the generation point table 24 based on the information and determines whether or not the information has already been registered (S312). If it is determined that the information has already been registered (S312: Yes), the external object disposition unit 15 acquires a corresponding generation point ID 271, and acquires a life 262 corresponding to the generation point ID 271 from the life information table 26 (S314).

Successively, the external object disposition unit 15 determines whether or not the acquired life 262 exceeds a predetermined threshold value (S316). If it is determined that the life 262 exceeds the predetermined threshold value (S316: Yes), the external memory securing unit 16 is called so as to secure a disposition region of the object (S318). Thereafter, the external object disposition unit 15 stores the object in the secured memory region and finishes the present process (S320).

In addition, if it is determined in S312 that generation information of the object generated by the program execution unit 12 has not been registered in the generation point table 24 (S312: No), or if it is determined in S316 that the life 262 corresponding to the generation point ID 271 is equal to or less than the predetermined threshold value (S312: No), the external object disposition unit 15 passes the control to the object disposition unit 14C, and finishes the present process.

Figure 19:
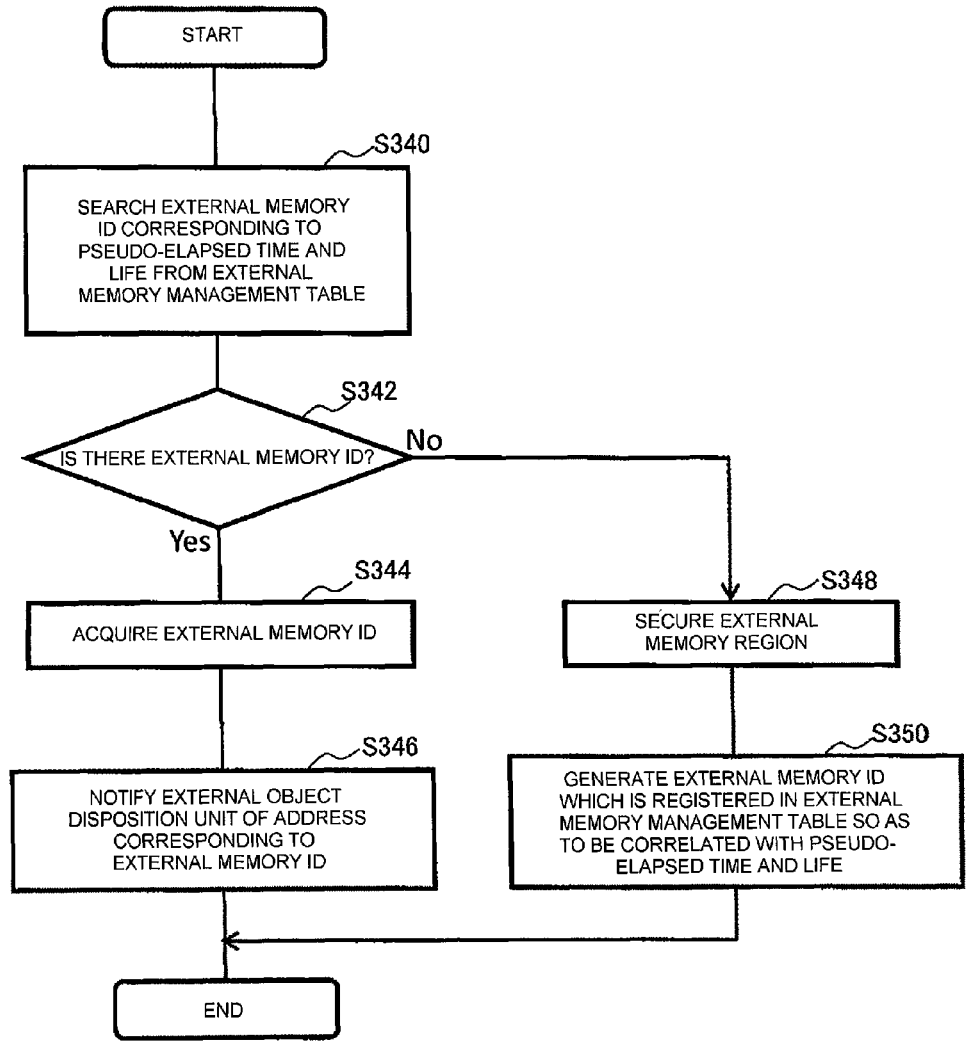
FIG. 19 is a flowchart illustrating a process by an external memory securing unit of the embodiment to which the present invention is applied.

Next, a process by the external memory securing unit 16 will be described. FIG. 19 shows a process flow by the external memory securing unit 16.

The external memory securing unit 16 searches the external memory management table 28 based on the pseudo-elapsed time 22 and the life 262 of the object received from the external object disposition unit 15 and determines whether or not there is an external memory ID corresponding to the pseudo-elapsed time 22 and the life 262 (S340).

If it is determined that there is the external memory ID (S342: Yes), the external memory securing unit 16 acquires the external memory ID 283 corresponding to the pseudo-elapsed time 22 and the life 262 (S344), notifies the external object disposition unit 15 of an address of the external memory region 27 corresponding to the external memory ID (S346), and finishes the present process. In other words, the external memory securing unit 16 secures a memory region in which the object is disposed in S346.

On the other hand, if it is determined in S342 that there is no corresponding external memory ID 283 in the external memory management table 283 (S342: No), the external memory securing unit 16 secures a new external memory region 27 from the memory 2 (S348).

Next, the external memory securing unit 16 generates an external memory ID 283 for specifying the newly secured external memory region 27 so as to be registered in the external memory management table 28, and registers the pseudo-elapsed time 22 and the life 262 of the object in the external memory management table 28 so as to be correlated with the external memory ID 283 as the generation time information 281 and the life 282 (S350). Then, the external memory securing unit 16 proceeds to S346, notifies the external object disposition unit 15 of an address corresponding to the generated external memory ID 283, and finishes the present process.

Figure 20:
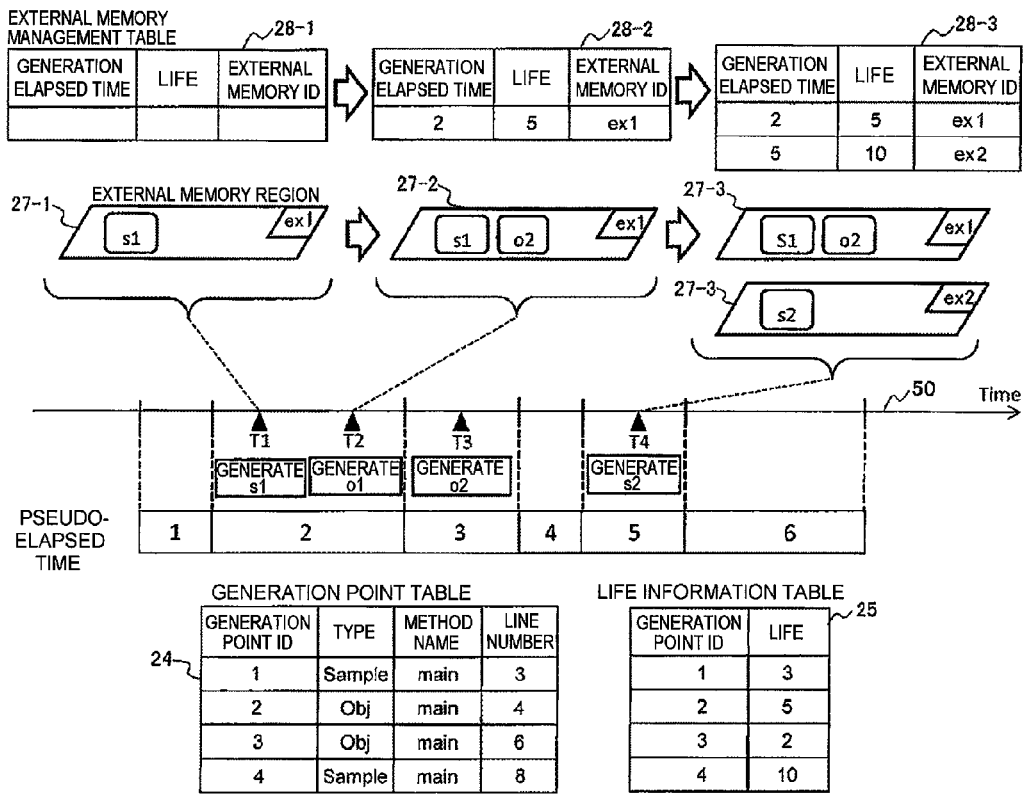
FIG. 20 is a schematic diagram illustrating an operation process by a computer system of the third embodiment to which the present invention is applied.

FIG. 20 schematically shows a process example executed by the computer system 300. This figure has contents similar to the contents shown in FIG. 9 of the first embodiment and FIG. 15 of the second embodiment, and shows a state in which the pseudo-elapsed time 22 is updated along the time axis 50. An update trigger of the pseudo-elapsed time 22 may employ any of timing of GC occurrence described in the first embodiment and timing when an object capacity which is added in the short life region 211 in a cumulative manner exceeds a threshold value described in the second embodiment, and, in description of FIG. 20, it is assumed that the pseudo-elapsed time 22 is updated at the timing when an object capacity which is added in a cumulative manner exceeds a threshold value.

In addition, a threshold value of an object life used for determining whether or not a generated object is disposed in the external memory region 27 is assumed as "4" which is set by a user via the input and output device 5.

Further, FIG. 20 shows state transition of the external memory region 27 and the external memory management table 28 by exemplifying objects generated at time points of the time T1, T2 and T4. Furthermore, the generation point table 24 and the life information table 25 are assumed to have already been used for life analysis of an object.

In addition, it is assumed that a Java program 20C is employed in the description referring to FIG. 20. FIG. 21 shows the Java program 20C. In this program, a "Test" class is defined, and a "main" method is defined therein. In description of FIG. 20, the Java VM 10 repeatedly executes this program.

First, at the time T1, when the program execution unit 12 executes the third line "Sample s1=new Sample( );" of the Java program 20C, a Sample object "s1" is generated. The external object disposition unit 15 searches the generation point table 24 based on the type "Sample" of the generated object, the method name "main" of the generation point, and the line number "3", and acquires a corresponding generation point ID "1" (the first row of the generation point table).

The external object disposition unit 16 searches the life information table 25 based on the acquired generation point ID "1", and acquires a corresponding life "5". Since the threshold value of a life set in advance by the user is "4", the external object disposition unit 15 requests the external memory securing unit 16 to secure the external memory region 27, and, after a region is secured, the external object disposition unit disposes the generated object "s1" in the secured region (refer to the external memory 25-1).

When this external memory region 27 is secured, the external memory securing unit 16 searches the external memory management table 28-1 based on the current pseudo-elapsed time "2" and the life "5" of the object disposed in the external memory region 27, and tries to acquire a corresponding external memory ID. Since there is no corresponding information in the external memory management table 28-1, the external memory securing unit 16 secures a new external memory region from the memory 2. Then, the external memory securing unit 16 registers the pseudo-elapsed time "2", the life "5"

of the object, and the newly generated external memory ID "ex1" in the external memory management table 28 so as to be correlated with each other (refer to the external memory management table 28-2).

Next, at the time T2, when the program execution unit 12 executes the fourth line "Obj o1=new Obj( );" of the Java program 20C, an Obj object "o1" is generated. The external object disposition unit 15 searches the generation point table 24 and the life information table 25 based on information or the like of the generated object, and acquires the life "5" of the object "o1". Since this life is greater than the threshold value "4" of the object life set by the user, the external object disposition unit 25 requests the external memory securing unit 16 to secure the external memory region 27, and disposes the object "o1" in the secured region (refer to the external memory region 25-2).

The external memory securing unit 16 at this time is operated as follows. The external memory securing unit 16 searches the external memory management table 28-2 based on the pseudo-elapsed time "2" of the object and the life "5" of the object, and tries to acquire a corresponding external memory ID. As a result, the external memory ID "ex1" which has been registered through the previous process is detected. Therefore, the external memory securing unit 16 notifies the external object disposition unit 15 of the external memory region "ex1" as a disposition destination of the object "o1". In addition, since the external memory securing unit 15 can detect the corresponding external object ID from the external memory management table 28-2 this time, a registration process in the external memory management table 28-2 is not performed.

In addition, next, at the time T3, when the program execution unit 12 executes the sixth line "Obj o2=new Obj( );" of the Java program 20C, an Obj object "o2" is generated. The external object disposition unit 15 searches the generation point table 24 and the life information table 25 based on information or the like of the generated object, and acquires the life "2" of the object "o2" (the third row of the generation point table 24, and third row of the life information table 25). Since this life is equal to or less than the threshold value "4" of the object life set by the user, the object disposition unit 14C disposes the object "o2" in the short life region 211 of the Java heap 21. In addition, since there is no process by the external memory securing unit 15 this time, a registration process in the external memory management table 28 is not performed.

Finally, at the time T4, when the program execution unit 12 executes the eighth line "Sample s2=new Sample( );" of the Java program 20C, a Sample object "s2" is generated. The external object disposition unit 16 searches the generation point table 24 and the life information table 25 based on information or the like of the generated object, and acquires a life "10" of the object "s2" (the fourth row of the generation point table 24 and the fourth row of the life information table 25). Since this life is greater than the threshold value "4" of the object life set by the user, the external object disposition unit 15 requests the external memory securing unit 16 to secure the external memory region 27, and disposes the object "s2" in the secured region.

The external memory securing unit 16 at this time is operated as follows. The external memory securing unit 16 searches the external memory management table 28-2 based on the pseudo-elapsed time "5" of the object "s2" and the life "10" of the object, and tries to acquire a corresponding external memory ID. As a result, there is no corresponding external memory ID in the external memory management table 28-2, and thus the external memory securing unit 16 secures a new external memory region (an ID thereof is "ex2") from the memory 2 and notifies the external object disposition unit 15 of the new external memory region (ex2).

In addition, the external memory securing unit 16 registers the pseudo-elapsed time "5" of the object "s2", the life "10" of the object "s2", and the newly generated external memory ID "ex2" in the external memory management table 28 (refer to the external memory management table 28-3).

As described above, the computer system 300 can change the external memory region 27 in which an object is disposed by using an object life using a generation point of the object. For this reason, there is an effect in which objects of which lifetimes are approximately the same can be disposed in the same external memory region 27. Generally, timing when objects generated at the same time become unnecessary tends to be almost the same time. From this, it can be said that, when a certain external memory region 27 is released by the external memory releasing unit 17, if it is detected that a single object disposed in the released external memory region 27 is unnecessary, there is a high possibility that other objects disposed in the external memory region 27 may be also unnecessary, and there is a high possibility that system defects may not occur even if the external memory region 27 is released. Therefore, there is an effect in which releasing efficiency of the external memory region 27 is improved.

In addition, the computer system 300 has a configuration in which a threshold value of an object life can be set to any value by a user. Therefore, an object disposed in the external memory region 27 can be flexibly managed by adjusting a threshold value of an object life, and thus there is an effect in which the number of occurrences of GC in Java VM 10 can be adjusted.

As above, although the embodiments of the present invention have been described, the present invention is not limited to these configurations, and may have various configurations in the scope without departing from the spirit thereof.

In addition, software or the like which realizes the above-described respective functional units may be recorded on a magnetic or optical portable recording medium, and may be installed in a computer using the recording medium. Further, the software may be installed in a computer by being downloaded via a network such as the Internet.

REFERENCE SIGNS LIST

1 CPU
2 MEMORY
3 AUXILIARY STORAGE DEVICE
4 EXTERNAL STORAGE DEVICE
5 INPUT AND OUTPUT DEVICE
10 Java VM
12 PROGRAM EXECUTION UNIT
13 GARBAGE COLLECTOR
14A, 14B AND 14C OBJECT DISPOSITION UNIT
15 EXTERNAL OBJECT DISPOSITION UNIT
16 EXTERNAL MEMORY MANAGEMENT UNIT
17 EXTERNAL MEMORY RELEASING UNIT
19 OBJECT LIFE ANALYSIS UNIT
20A and 20C Java PROGRAM
21 Java HEAP
22 PSEUDO-ELAPSED TIME
23 OBJECT GENERATION TABLE
24 GENERATION POINT TABLE
25 LIFE INFORMATION TABLE
26 REGION SECURING INFORMATION
27 EXTERNAL MEMORY REGION
28 EXTERNAL MEMORY MANAGEMENT TABLE

The invention claimed is:

1. A computer comprising:
a memory including a first storage region in which objects generated by executing a program are disposed; and
a processor programmed to execute the program and release the storage region,
wherein the processor is further programmed to:
acquire information of a program generating one object of the objects stored in the first storage region and time information at the time of generation of the one object which are recorded in a recording device so as to be correlated with each other when the one object is generated;
detect that the one object is unnecessary to execute a subsequent program among the objects stored in the first storage region and acquires, at the time of the detection, time information which has been updated in accordance with a predetermined trigger; and
record a difference between the time information at the time of the generation of the one object and the time information at the time of the detection of the one object in the recording device so as to be correlated with the information of the program.

2. The computer according to claim 1,
wherein the processor updates the time information when garbage collection is executed as the predetermined trigger.

3. The computer according to claim 1,
wherein the processor updates the time information when a capacity of the objects stored in the first storage region exceeds a capacity threshold value as the predetermined trigger.

4. The computer according to claim 3,
wherein the processor updates the time information when a cumulative capacity of the objects stored in the first storage region exceeds the capacity threshold value, and resets the cumulative capacity.

5. The computer according to claim 4,
wherein the processor is further programmed to:
set the capacity threshold value based on a value input via an input device which can be operated by a user.

6. The computer according to claim 3,
wherein the processor is further programmed to:
set the capacity threshold value based on a value input via an input device which can be operated by a user.

7. The computer according to claim 1,
wherein the information of the program includes at least information regarding a method which generates the one object.

8. The computer according to claim 7,
wherein the information regarding the method includes a method name and a line number.

9. The computer according to claim 1,
wherein, when the one object stored in the first storage region does not refer to other objects or is not referred to by other objects, the processor detects that the one object is unnecessary.

10. The computer according to claim 1,
wherein the processor is further programmed to:
acquire the recorded difference of the one object when the information of the program generating the one object, acquired at the time of generation of the object, and the time information at the time of generation of the one object have already been recorded; and
secure a second storage region in the memory which is not a target of garbage collection when the recorded difference of the one object exceeds a predetermined threshold value, and disposes the one object in the second storage region.

11. The computer according to claim 10,
wherein the processor is further programmed to:
store the recorded difference of the object, time information when the second storage region is secured, and information for specifying the second storage region so as to be correlated with each other; and
secure a third storage region which is not a target of garbage collection if the recorded difference of the one object and current time information are not stored when the second storage region is secured.

12. The computer according to claim 11,
wherein the processor disposes the one object in the third storage region which is not a target of garbage collection based on information for specifying another storage region correlated with the recorded difference of the one object and the current time information if the recorded difference of the one object and the current time information are stored when another storage region is secured.

13. The computer according to claim 10,
wherein the processor is further programmed to:
set the predetermined threshold value based on a value input via an input device which can be operated by a user.

14. The computer according to claim 10,
wherein the processor is further programmed to:
determine whether or not the one object stored in the second storage region is unnecessary to execute a subsequent program, and, when it is determined that the one object is unnecessary, release the second storage region.

15. A control method of a computer including a memory having a storage region in which objects generated by executing a program are disposed, and a processor programmed to execute the program and release of the storage region, the control method comprising:
causing the processor to:
acquire information of a program generating one object of the objects stored in the storage region and time information at the time of generation of the one object which are recorded so as to be correlated with each other when the one object is generated;
detect that the one object is unnecessary to execute a subsequent program among the objects stored in the storage region and acquire, at the time of the detection, the time information which has been updated in accordance with a predetermined trigger; and
record a difference between the time information at the time of the generation of the one object and the time information at the time of the detection of the one object so as to be correlated with the information of the program.

16. A non-transitory computer readable medium storing instructions causing a computer, which includes a memory having a storage region in which objects generated by executing a program are disposed and a processor programmed to execute the program and release of the storage region, to execute a method comprising:
acquiring information of a program generating one object of the objects stored in the storage region and time information at the time of generation of the one object which are recorded so as to be correlated with each other when the one object is generated;
detecting that the one object is unnecessary to execute a subsequent program among the objects stored in the storage region and acquiring, at the time of the detection, time information which has been updated in accordance with a predetermined trigger; and recording a difference between the time information at the time of the generation of the one object and the time information at the time of the detection of the one object so as to be correlated with the information of the program.

* * * * *